(12) United States Patent
Friedman

(10) Patent No.: US 6,428,247 B1
(45) Date of Patent: *Aug. 6, 2002

(54) PARTING OR GROOVING INSERT

(75) Inventor: Jacob Friedman, Kfar Vradim (IL)

(73) Assignee: Iscar Ltd., Migdal Tefen (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/566,576

(22) Filed: Nov. 28, 1995

(30) Foreign Application Priority Data

Dec. 14, 1994 (IL) .................................................. 111976

(51) Int. Cl.$^7$ ........................... B23B 27/04; B23B 29/14
(52) U.S. Cl. ......................... 407/110; 407/113; 407/117
(58) Field of Search ................................ 407/117, 109, 407/110, 113, 114, 115, 116, 105, 107; 83/835, 838, 839, 854, 855, 845, 955, 698, 41, 698.51

(56) References Cited

U.S. PATENT DOCUMENTS

| | | | |
|---|---|---|---|
| 2,414,231 A | * 1/1947 | Kraus | 407/118 |
| 3,316,617 A | * 5/1967 | Stein | 407/117 X |
| 4,588,332 A | * 5/1986 | Komanduri et al. | 407/114 |
| 4,616,962 A | * 10/1986 | Ushijima et al. | 407/113 |
| 4,619,563 A | * 10/1986 | Doting | 407/118 |
| 4,627,317 A | * 12/1986 | Komanduri et al. | 407/113 X |
| 4,778,311 A | * 10/1988 | Niemi | 407/117 |
| 4,890,961 A | 1/1990 | Carl et al. | 407/105 |
| 4,992,007 A | * 2/1991 | Satran | 407/117 |
| 5,032,050 A | * 7/1991 | Niebauer et al. | 407/114 |
| 5,137,396 A | * 8/1992 | Durschinger | 407/117 |
| 5,156,502 A | * 10/1992 | Satran | 407/117 |
| 5,207,538 A | * 5/1993 | Satran | 407/113 |
| 5,308,197 A | * 5/1994 | Little | 407/117 |
| 5,411,354 A | * 5/1995 | Gustafsson | 407/117 |
| 5,439,327 A | * 8/1995 | Wertheim | 407/113 X |
| 5,443,334 A | * 8/1995 | Pantzar | 407/113 |
| 5,454,670 A | * 10/1995 | Noda et al. | 407/114 X |
| 5,486,073 A | * 1/1996 | Satran et al. | 407/113 |
| 5,516,241 A | * 5/1996 | Plutschuck et al. | 407/110 |
| 5,580,194 A | * 12/1996 | Satran et al. | 407/144 X |
| 5,697,271 A | * 12/1997 | Friedman et al. | 407/109 X |

FOREIGN PATENT DOCUMENTS

| | | |
|---|---|---|
| DE | 232 850 | 2/1986 |
| EP | 0 365 299 | 4/1990 |
| EP | 0 582 135 | 2/1994 |
| EP | 0 654 316 | 5/1995 |

* cited by examiner

*Primary Examiner*—Charles Goodman
(74) *Attorney, Agent, or Firm*—Pennie & Edmonds LLP

(57) ABSTRACT

A double-ended parting or grooving insert comprising a central body portion and a pair of opposite cutting end portions; each cutting end portion having an upper rake surface and front and side relief flanks and a front cutting edge formed at an intersection of the rake surface and the front relief flank; the front relief flank comprising an upper relief flank surface; a lower abutment surface inset with respect to the upper and disposed substantially normally with respect to a longitudinal median plane intersecting the front cutting edges and an intermediate surface serving to bridge the upper and lower surfaces.

15 Claims, 4 Drawing Sheets

PARTING OR GROOVING INSERT

FIELD OF THE INVENTION

This invention relates to a parting or grooving insert.

BACKGROUND OF THE INVENTION

Such parting or grooving inserts of the kind to which the present invention particularly relates are formed with a front cutting edge which is inclined with respect to a normal to a longitudinal median plane of the insert by an angle known as the lead angle of the insert. Such inserts are generally divided into three categories, namely right-hand and left-hand inserts depending on the direction of inclination of the insert and neutral inserts where the leading angle is substantially zero.

It is known to provide double-ended indexable inserts having a central body portion and a pair of opposite cutting end portions. Such inserts are designed to be releasably retained between a pair of clamping jaws formed in an insert holder so that one operational cutting end portion is, at any particular time disposed so as to extend beyond the holder whilst the other non-operational insert is retained within the holder. In order to ensure an effective constant positioning of the insert within the holder and, in consequence of the operational cutting edge, it is generally arranged that the holder is formed with a support surface which is abutted by the rear non-operational end of the insert and in this way it is ensured that in operation the insert is always held in a predetermined position.

With such known double-ended inserts the cutting edge is formed at the intersection of an upper rake surface of the insert and a front relief flank thereof. Where with right-handed or left-handed inserts the cutting end portion is formed with a leading angle the relief flank is correspondingly inclined with respect to a normal to a longitudinal median plane of the insert. In consequence, when the insert is fully mounted in the holder the rear end thereof abuts the holder's supporting surface via an edge portion of the relief flank rather than by way of surface-to-surface abutment. It will be readily appreciated that such an edge-to-surface abutment gives rise to an instability of mounting of the insert in the holder. It will furthermore be realized that, if the support surface of the holder were formed to be similarly inclined to the relief flank so that an effective surface-to-surface abutment of the insert and the support surface would be achieved, differing holders having differingly inclined support surfaces would have to be provided for right-hand and left-hand inserts.

It is an object of the present invention to provide a new and improved double-ended cutting insert wherein the above-referred to disadvantages are substantially reduced or avoided.

BRIEF SUMMARY OF THE INVENTION

According to the present invention there is provided a double-ended parting or grooving insert comprising a central body portion and a pair of opposite cutting end portions; each cutting end portion having an upper rake surface and front and side relief flanks and a front cutting edge formed at an intersection of said rake surface and said front relief flank; characterized in that said front relief flank comprises an upper relief flank surface component; a lower abutment surface component inset with respect to said upper component and disposed substantially normally with respect to a longitudinal median plane intersecting said front cutting edges and an intermediate surface serving to bridge said upper and lower components.

Preferably said cutting edge and said upper relief flank surface are inclined with respect to a normal to said plane by a leading angle of said cutting edge.

Thus, the double-ended parting or grooving insert in accordance with the invention can be either of the neutral type where the front cutting edge and the associated upper relief flank surface have a zero leading angle or of the right-hand or left-hand type where the front cutting edge and the associated upper relief flank surface have leading angles of respectively opposite senses. In all cases, however, the cutting insert can be securely retained in an appropriate insert holder with its abutment surface abutting over its entire surface area the adjacent support surface of the holder. In this way the same insert holder can be effectively used irrespective of whether the insert is neutral, right-handed or left-handed and at the same time ensure the effective supportive abutment of the insert within the holder.

BRIEF SUMMARY OF THE DRAWINGS

For a better understanding of the present invention and to show how the same may be carried out in practice and by way of example, reference will now be made to the accompanying drawings in which.

DETAILED DESCRIPTION OF PREFERRED EMBODIMENT

Figure 1:
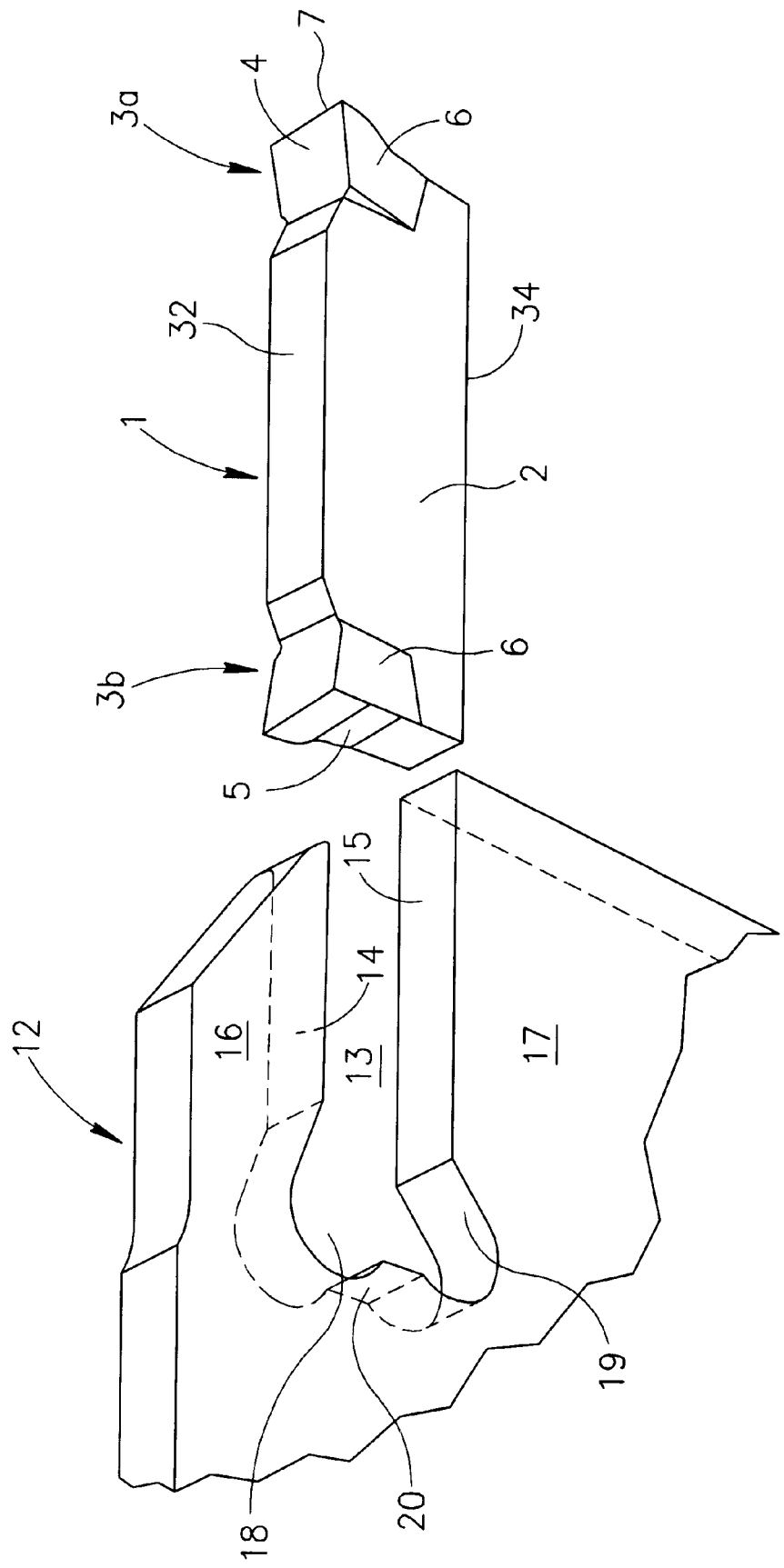
FIG. 1 is a schematic perspective view of a double-ended parting insert in accordance with the invention juxtaposed with respect to an insert holder.

As seen in the drawings a double-ended parting and grooving insert 1 comprises a central body portion 2 and, a pair of opposite cutting end portions 3a and 3b. Each cutting end portion (3a,3b) comprises a rake surface 4 and a front relief flank 5 and a side relief flank 6. A front cutting edge 7 is formed at the intersection of the rake surface 4 and the front relief flank 5. As seen in the top view of the insert in FIG. 2, the maximal width of the insert is defined between the side relief flanks 6 near the front cutting edge 7, and the upper insert surface 30 comprises an upper clamping surface 32 of the central body portion and the upper rake surfaces 4 of the cutting end portions 3a, 3b.

Figure 3:
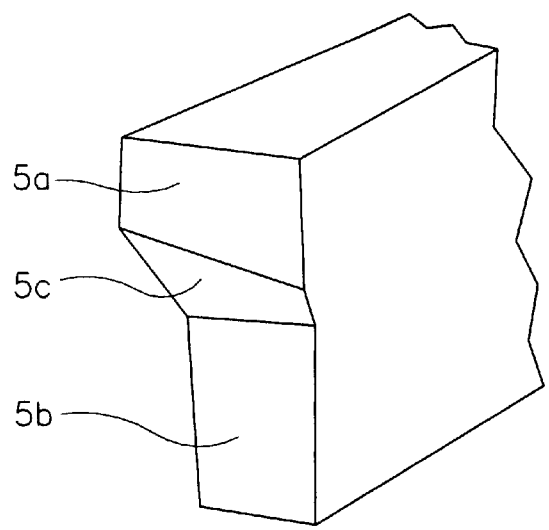
FIG. 3 is a schematic perspective view of a cutting end portion of the insert shown in FIGS. 1 and 2 (on an enlarged scale)

As can be clearly seen in FIG. 3 of the drawings each front relief flank 5 comprises an upper, front relief flank surface 5a, a lower abutment surface 5b and an intermediate surface 5c which serves to bridge the upper and the lower surfaces 5a and 5b.

Figure 2:
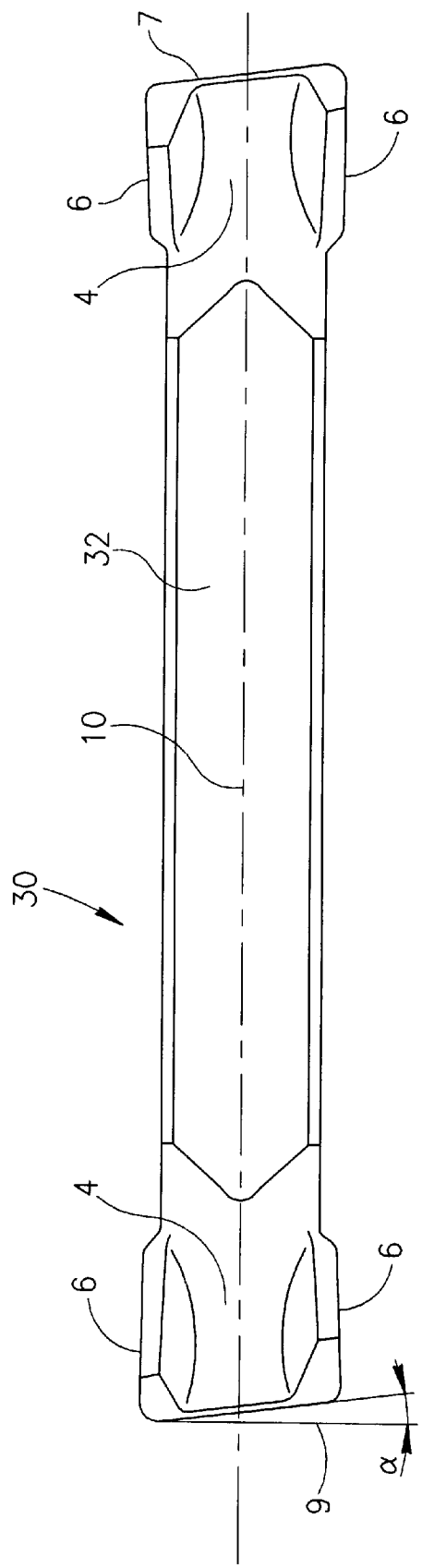
FIG. 2 is a plan view from above of the insert shown in FIG. 1.

Thus, the intermediate surface 5c is disposed angularly with respect to both the upper and lower surfaces and so is non-coplanar with both the upper and lower surfaces. As also seen in FIG. 3, the intermediate surface occupies a smaller portion of the front relief flank than either the upper or the lower surfaces. Furthermore and as can be clearly seen in FIG. 3 of the drawings the lower abutment surface is inset with respect to the upper relief flank surface 5a. As can be seen in FIG. 2 of the drawings each front cutting edge is inclined with respect to a line 9 normal to a longitudinal median plane 10 of the insert by an angle a known as the leading angle of the insert. Depending on the sense of the angle α the insert can be right-handed or left-handed whilst when the angle α is zero the insert is neutral. As can be seen in FIG. 3 of the drawings the upper relief flank surface 5a is also inclined with respect to a line normal to the longitudinal median axis of the insert by the same leading angle α. On the other hand, the lower abutment surface is disposed substantially normally with respect to the longitudinal median plane of the insert.

Figure 4:
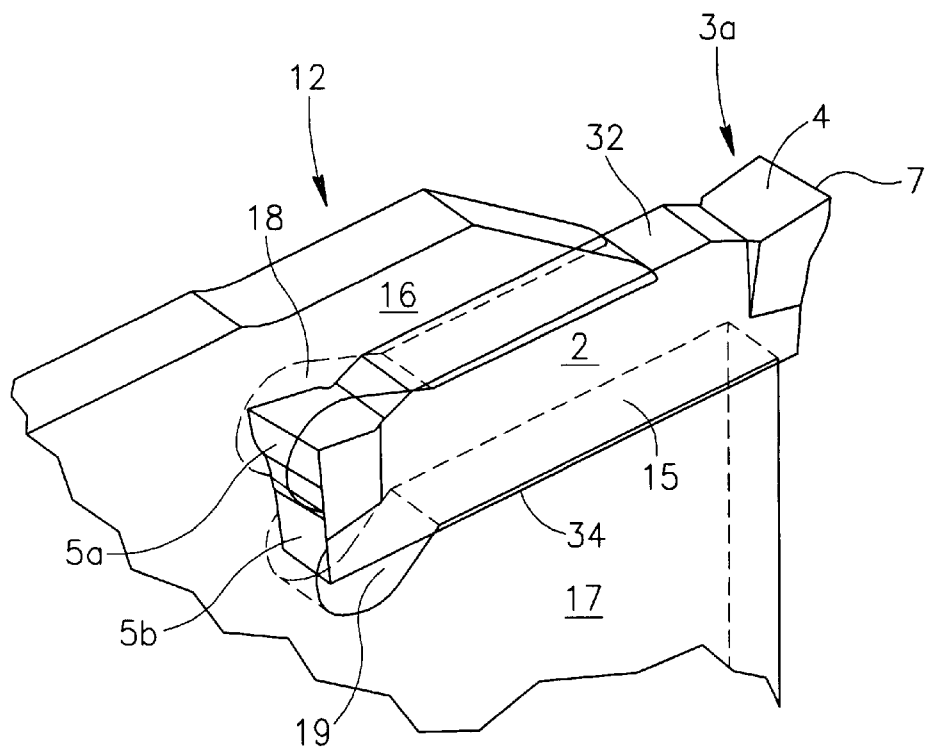
FIG. 4 is a perspective view of the insert shown in the preceding Figures retainably fitted within the insert holder shown in FIG. 1.

As can be seen in FIGS. 1 and 4, the insert is designed to be retained in an insert holder 12 having an insert retaining slot 13 defined between upper and lower clamping surfaces 14 and 15 of an upper, resiliently displaceable clamping jaw 16 and a lower, relatively fixed clamping jaw 17.

An inner rear end of the retaining slot 13 is formed with upper and lower curved recesses 18 and 19 and a central support surface 20.

As can be seen from FIG. 4 of the drawings, when the insert is retained in position within the insert holder 12 the surfaces 14 and 15 clampingly engage the upper 32 and lower 34 surfaces of the central body portion 2 of the insert whilst the abutting surface 5b of the insert bears abuttingly against the support surface 20 of the holder. In this way, with the non-operational cutting end 3b disposed within the holder, the cutting edge 7 thereof is located within the recess 18 whilst the lowermost base edge of the insert is located within the recess 19.

It will be readily appreciated that, irrespective of the sense of the leading angle of the insert the latter is firmly retained within the holder with its abutment surface 5b abutting along its entire surface the supporting surface 20 of the holder. In this way, one and the same holder type can be used securely to retain both right-handed and left-handed inserts whilst, of course, if the insert is of the neutral kind it can equally well be securely retained within the holder.

Figure 5:
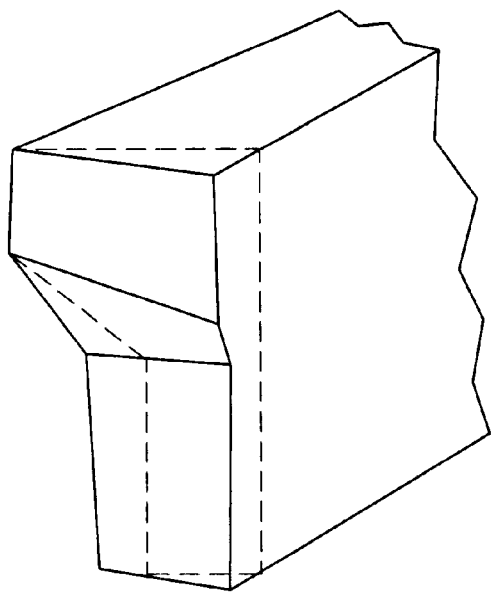
FIG. 5 illustrates a modified cutting end portion of a double-ended insert in accordance with the invention.
Figure 6:
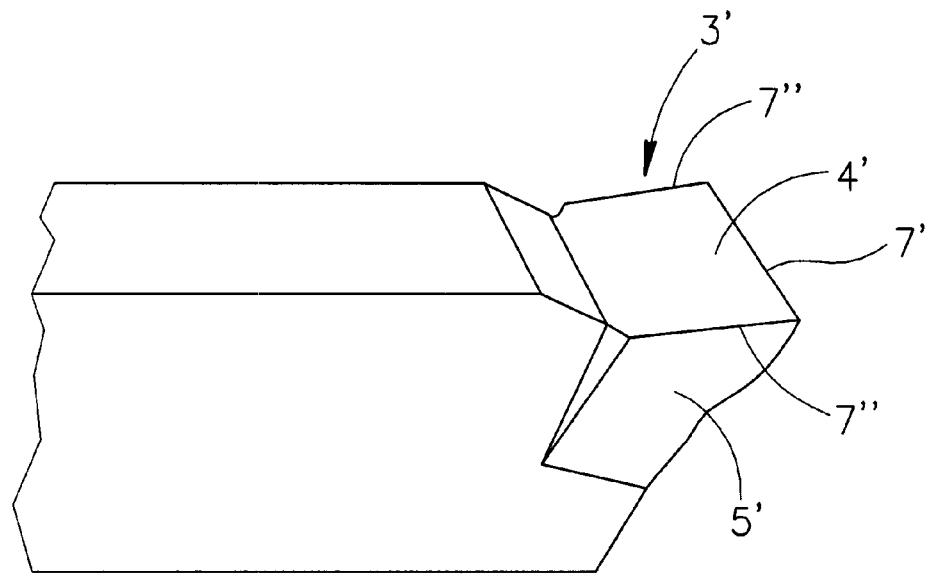
Fig. 6 illustrates an insert in accordance with the present invention further having side cutting edges.

Whilst double-ended parting and grooving inserts of the kind just described in accordance with the invention can be readily prepared by compacting of, for example tungsten carbide powders in a suitable die for subsequent sintering, thereby obviating in many cases the necessity of subsequent grinding operations, it is possible to produce inserts in accordance with the present invention utilizing such grinding operations. In this connection reference is directed to FIG. 5 of the drawings where, an insert such as that shown in FIG. 3 of the drawings which has been prepared by compacting and sintering may be subsequently ground so as to provide a much increased lead angle the grinding taking place along the chain dotted lines shown in FIG. 5. In this case, the cutting edge and the upper relief flank surface will exhibit the increased lead angle whilst the lower component of the relief flank will now be formed of two portions, a first constituting an effective abutment surface which is designed to abut over its surface the support surface 20 of the holder whilst the remaining portion is directed at an angle thereto.

Cutting inserts in accordance with the present invention which can, as explained, be of the neutral right-handed or left-handed kind can be effectively and securely retained in insert holders which can be used for all types whilst, at the same time ensuring that the rear end of the insert is effectively supported by abutting over a significant surface area the support surface formed by the holder.

Preferably, parting and grooving inserts whose cutting edges have leading angles which range from 0° to 20° can be effectively employed in accordance with the present invention.

Whilst the invention has been particularly described by way of example with reference to a double-ended parting and grooving insert having a single front cutting edge 7' the invention is equally applicable to such inserts wherein side cutting edges 7" are formed by the intersection, at each cutting end portion 3', of the upper rake surface 4' with the respective side relief flanks 5'. In this case the insert can alternatively be used for grooving and parting or for turning.

What is claimed is:

1. A double-ended parting and grooving cutting insert comprising:
    a central body portion extending between a pair of opposite cutting end portions, each cutting end portion having an upper rake surface and front and side relief flanks and a front cutting edge formed at an intersection of said rake surface with said front relief flank, said front cutting edge extending between said side relief flanks, said side relief flanks defining between themselves a maximal width of the cutting insert in a top view of the cutting insert; wherein
    said front relief flank comprises an upper relief flank surface, a lower abutment surface inset with respect to said upper relief flank surface and disposed substantially normally with respect to a longitudinal median plane intersecting said front cutting edges, and an intermediate surface serving to bridge said upper and lower surfaces and being disposed angularly with respect to each of said upper and lower surfaces,
    each of the front cutting edges is straight in said top view and is inclined at a non-zero leading angle with respect to a line normal to said longitudinal median plane,
    the central body portion is provided with upper and lower clamping surfaces, and
    the cutting insert has an upper insert surface in said top view, said upper insert surface comprising said upper rake surfaces of both cutting end portions and the upper clamping surface of said central body portion.

2. An insert according to claim 1, wherein side cutting edges for use in turning are formed at respective intersections of said rake surface and said side relief flanks.

3. An insert according to claim 1, wherein said intermediate surface is inset with respect to said upper relief flank surface and protrudes from said lower abutment surface.

4. An insert according to claim 1, wherein said upper relief flank surface, said intermediate surface and said lower abutment surface have substantially a same width in a direction perpendicular to said longitudinal median plane.

5. An insert according to claim 1, wherein said upper relief flank surface is substantially planar.

6. An insert according to claim 1, wherein said intermediate surface has an area which is substantially smaller than an area of each of said upper and lower surfaces.

7. A double-ended parting and grooving cutting insert comprising:
    a central body portion extending between a pair of opposite cutting end portions, each cutting end portion having an upper rake surface and front and side relief flanks and a front cutting edge formed at an intersection of said rake surface with said front relief flank, said front cutting edge extending between said side relief flanks, said side relief flanks defining between themselves a maximal width of the cutting insert in a top view of the cutting insert; wherein said front relief flank comprises an upper relief flank surface, a lower abutment surface inset with respect to said upper relief flank surface and disposed substantially normally with respect to a longitudinal median plane intersecting said front cutting edges, and an intermediate surface serving to bridge said upper and lower surfaces and being disposed angularly with respect to each of said upper and lower surfaces, said intermediate surface having an area which is smaller than an area of each of said upper and lower surfaces, each of the front cutting edges is straight in said top view and is inclined at a non-zero leading angle with respect to a line normal to said longitudinal median plane, the central body portion is provided with upper and lower clamping surfaces, and the cutting insert has an upper insert surface in said top view, said upper insert surface comprising said upper rake surfaces of both cutting end portions and the upper clamping surface of said central body portion.

8. An insert according to claim 7, wherein said upper relief flank surface is substantially planar.

9. An insert according to claim 7, wherein said intermediate surface is inset with respect to said upper relief flank surface and protrudes with respect to said lower abutment surface.

10. A double-ended parting and grooving cutting insert comprising:

a central body portion extending between a pair of opposite cutting end portions, each cutting end portion having an upper rake surface and front and side relief flanks, with a front cutting edge extending between said side relief flanks, said side relief flanks defining between themselves a maximal width of the cutting insert in a top view of the cutting insert;

said front relief flank comprising an upper surface constituting a relief flank surface and intersecting said rake surface at said front cutting edge, a lower surface constituting an abutment surface of the cutting insert which is inset with respect to said upper surface, and an intermediate surface serving to bridge said upper and lower surfaces and being disposed angularly with respect to each of said upper and lower surfaces, wherein each of the front cutting edges is straight in said top view and is inclined at a non-zero leading angle with respect to a line normal to a longitudinal median plane which intersects said front cutting edges, the central body portion is provided with upper and lower clamping surfaces, and the cutting insert has an upper insert surface in said top view, said upper insert surface comprising said upper rake surfaces of both cutting end portions and the upper clamping surface of said central body portion.

11. An insert according to claim 10, wherein said intermediate surface has an area which is substantially smaller than an area of each of said upper and lower surfaces.

12. A double-ended parting and grooving cutting insert comprising:

a central body portion extending between a pair of opposite cutting end portions, each cutting end portion having an upper rake surface and front and side relief flanks and a front cutting edge formed at an intersection of said rake surface with said front relief flank, said front cutting edge extending between said side relief flanks, said side relief flanks defining between themselves a maximal width of the cutting insert in a top view of the cutting insert; wherein said front relief flank comprises an upper relief flank surface, a lower abutment surface inset with respect to said upper relief flank surface and an intermediate surface serving to bridge said upper and lower surfaces, said intermediate surface being non-coplanar with the upper surface and also with the lower surface, each of the front cutting edges is straight in said top view and is inclined at a non-zero leading angle with respect to a line normal to a longitudinal median plane which intersects said front cutting edges, the central body portion is provided with upper and lower clamping surfaces, and the cutting insert has an upper insert surface in said top view, said upper insert surface comprising said upper rake surfaces of both cutting end portions and the upper clamping surface of said central body portion.

13. A parting and grooving cutting insert comprising:

a central body portion extending between a pair of cutting end portions, each cutting end portion having an upper rake surface and front and side relief flanks and a front cutting edge formed at an intersection of said rake surface with said front relief flank, said front cutting edge extending between said side relief flanks, said side relief flanks defining between themselves a maximal width of the cutting insert in a top view of the cutting insert; wherein said front relief flank comprises an upper relief flank surface, a lower abutment surface inset with respect to said upper relief flank surface and an intermediate surface serving to bridge said upper and lower surfaces, said intermediate surface being non-coplanar with the upper surface and also with the lower surface, and each of the front cutting edges is straight in said top view and is inclined at a non-zero leading angle with respect to a line normal to a longitudinal median plane which intersects said front cutting edges.

14. The parting and grooving cutting insert of claim 13, wherein said central body portion is provided with upper and lower clamping surfaces for retaining said cutting insert; and the cutting insert has an upper insert surface in said top view, said upper insert surface comprising said upper rake surfaces of both cutting end portions and the upper clamping surface of said central body portion.

15. A parting and grooving cutting tool assembly comprising:

an insert holder having an insert retaining slot, said slot being formed with upper and lower clamping surfaces and a support surface substantially transverse thereto; and a double-ended parting and grooving cutting insert comprising:

a central body portion extending between a pair of opposite cutting end portions, each cutting end portion having an upper rake surface and front and side relief flanks and a front cutting edge formed at an intersection of said rake surface with said front relief flank, said front cutting edge extending between said side relief flanks, said side relief flanks defining between themselves a maximal width of the cutting insert in a top view of the cutting insert; wherein said front relief flank comprises an upper relief flank surface, a lower abutment surface inset with respect to said upper relief flank surface and an intermediate surface serving to bridge said upper and lower surfaces, said intermediate surface being non-coplanar with the upper relief flank surface and also with the lower abutment surfaces, each of the front cutting edges is straight in said top view and is inclined at a non-zero leading angle with respect to a line normal to a longitudinal median plane which intersects said front cutting edges, the central body portion is provided with upper and lower clamping surfaces, and the cutting insert has an upper insert surface in said top view, said upper insert surface comprising said upper rake surfaces of both cutting end portions and the upper clamping surface of said central body portion, wherein said cutting insert is receivable into said insert retaining slot with one of said cutting end portions being disposed within the insert retaining slot, with said upper and lower clamping surfaces of the central body portion abutting, respectively, said upper and lower clamping surfaces of the insert retaining slot, and the lower abutment surface of said one cutting end portion abutting said support surface of the insert retaining slot.

\* \* \* \* \*